United States Patent
Jin et al.

(10) Patent No.: US 11,888,512 B2
(45) Date of Patent: *Jan. 30, 2024

(54) METHOD FOR PILOTING FROM BYPASS IN A NETWORK WITH OPEN WIRELESS CHANNELS

(71) Applicants: PEKING UNIVERSITY, Beijing (CN); BEIJING XINXING WEITONG TECHNOLOGY CO., LTD., Beijing (CN)

(72) Inventors: Ye Jin, Beijing (CN); Tao He, Beijing (CN); Guocheng Lv, Beijing (CN); Aimin Liu, Beijing (CN); Baoji Wang, Beijing (CN); Mingke Dong, Beijing (CN)

(73) Assignees: PEKING UNIVERSITY, Beijing (CN); BEIJING XINXING WEITONG TECHNOLOGY CO., LTD., Beijing (CN)

(*) Notice: Subject to any disclaimer, the term of this patent is extended or adjusted under 35 U.S.C. 154(b) by 39 days.

This patent is subject to a terminal disclaimer.

(21) Appl. No.: 17/630,520

(22) PCT Filed: Jul. 28, 2020

(86) PCT No.: PCT/CN2020/105098
§ 371 (c)(1),
(2) Date: Jan. 27, 2022

(87) PCT Pub. No.: WO2021/018120
PCT Pub. Date: Feb. 4, 2021

(65) Prior Publication Data
US 2022/0247450 A1 Aug. 4, 2022

(30) Foreign Application Priority Data
Jul. 30, 2019 (CN) .......................... 201910697454.1

(51) Int. Cl.
*H04B 1/7073* (2011.01)
*H04B 7/185* (2006.01)
(Continued)

(52) U.S. Cl.
CPC ..... *H04B 1/70735* (2013.01); *H04B 7/18513* (2013.01); *H04L 5/0048* (2013.01); *H04W 56/002* (2013.01)

(58) Field of Classification Search
CPC ............... H04L 5/0048; H04L 27/3455; H04L 27/2675; H04B 1/70735; H04B 7/18513;
(Continued)

(56) References Cited

U.S. PATENT DOCUMENTS

| 2002/0163466 A1* | 11/2002 | Jin ....................... H04B 7/2125 342/356 |
| 2003/0100298 A1* | 5/2003 | Butler ................... H04W 68/00 370/468 |

(Continued)

FOREIGN PATENT DOCUMENTS

| CN | 101166172 A | 4/2008 |
| CN | 101232472 A | 7/2008 |

(Continued)

OTHER PUBLICATIONS

"Channel Estimation for MIMO-OFDM Systems Based on Data Nulling Superimposed Pilots"; Farouk et al.; 2017 21st Conference of Open Innovations Association (FRUCT); Jan. 11, 2018 (Year: 2018).*

(Continued)

*Primary Examiner* — Benjamin H Elliott, IV
(74) *Attorney, Agent, or Firm* — Bayramoglu Law Offices LLC

(57) ABSTRACT

A method for piloting from bypass in a network with open wireless channels is disclosed. The method includes: 1)
(Continued)

selecting a terminal station as a reference in open wireless channels, and sending a pilot signal, in which all or some frequency bands of open wireless channels occupied by the pilot signal are pilot frequency bands, and the proportion of power of the pilot signal to the total power of the pilot frequency bands is 0.1‰-5%; 2) spreading the pilot signal with a spread spectrum code when it is transmitted, and then superimposing on a communication signal in the pilot frequency bands in a low power spectrum signal mode similar with noise; and 3) providing pilot, carrier wave and clock synchronization, standard timing and indication information for network construction and mutual communication of multiple types of terminal stations in channels by the pilot signal.

20 Claims, 4 Drawing Sheets

(51) Int. Cl.
*H04L 5/00* (2006.01)
*H04W 56/00* (2009.01)

(58) Field of Classification Search
CPC .. H04B 1/7073; H04B 1/7087; H04B 7/1851; H04W 56/002; H04W 52/325; H04J 13/0025; H04J 13/0029; H04J 13/004; H04J 3/0635
See application file for complete search history.

(56) References Cited

U.S. PATENT DOCUMENTS

| | | | | |
|---|---|---|---|---|
| 2004/0092228 A1* | 5/2004 | Force | ................. | H04B 7/18523 455/19 |
| 2005/0220051 A1* | 10/2005 | Lavean | ................... | H04J 13/00 370/330 |
| 2006/0013333 A1* | 1/2006 | Chen | ...................... | H04H 20/42 375/297 |
| 2008/0095277 A1* | 4/2008 | Cheng | .................. | H04L 5/0053 375/340 |
| 2008/0285595 A1* | 11/2008 | Chester | ................. | H04B 1/707 370/482 |
| 2011/0064161 A1* | 3/2011 | Lim | ..................... | H04L 25/4904 375/295 |
| 2011/0069737 A1* | 3/2011 | Jalali | ................. | H04W 72/0453 375/267 |
| 2012/0264371 A1* | 10/2012 | Kim | .................. | H04W 56/0015 455/13.2 |
| 2014/0348135 A1* | 11/2014 | Ozluturk | .............. | H04B 1/7075 370/335 |
| 2016/0242136 A1* | 8/2016 | Jung | ................. | H04W 56/0045 |
| 2017/0141906 A1* | 5/2017 | Rainish | ................ | H04B 7/1851 |
| 2017/0142743 A1* | 5/2017 | Yoon | ..................... | H04W 28/26 |
| 2022/0247450 A1* | 8/2022 | Jin | ........................ | H04B 1/7087 |
| 2022/0247482 A1* | 8/2022 | Jin | ..................... | H04B 7/18586 |
| 2022/0272703 A1* | 8/2022 | Jin | ........................ | H04B 7/2041 |
| 2022/0278744 A1* | 9/2022 | Jin | ...................... | H04W 56/001 |

FOREIGN PATENT DOCUMENTS

| | | |
|---|---|---|
| CN | 108847911 A | 11/2018 |
| CN | 110535911 A | 12/2019 |

OTHER PUBLICATIONS

"Distributed power allocation algorithm in wireless networks under SNR constraints"; Campos-Delgado et al.; AEU—International Journal of Electronics and Communications vol. 67, Issue 12, Dec. 2013, pp. 1015-1024 (Year: 2013).*

"Performance of Portable Radio Telephone Using Spread Spectrum"; Yamada et al.; IEEE Transactions on Communications, vol. COM-32, No. 7, Jul. 1984 (Year: 1984).*

"Pilot distribution optimization in multi-cellular large scale MIMO systems"; Marinello et al.; AEU—International Journal of Electronics and Communications vol. 70, Issue 8, Aug. 2016, pp. 1094-1103 (Year: 2016).*

* cited by examiner

METHOD FOR PILOTING FROM BYPASS IN A NETWORK WITH OPEN WIRELESS CHANNELS

CROSS REFERENCE TO THE RELATED APPLICATIONS

This application is the national phase entry of International Application No. PCT/CN2020/105098, filed on Jul. 28, 2020, which is based upon and claims priority to Chinese Patent Application No. CN 201910697454.1, filed on Jul. 30, 2019, the entire contents of which are incorporated herein by reference.

TECHNICAL FIELD

The invention relates to the technical field of wireless communication, in particular to a method for piloting from bypass in a network with open wireless channels.

BACKGROUND

Satellite channel is an important category of open wireless channels. Synchronous satellite communication is taken as an example of open wireless channels in the following technical description, and other scenarios of open wireless channels are similar, such as ground mobile communication network, radio communication network and trunking communication network.

There are two basic network forms in satellite network: a star network and a mesh network.

In a star network, any two terminal stations need to establish forward link synchronization and reverse link synchronization with a center station. After the synchronization is completed, the terminal station will apply to the center station for network access. It can join the network only after obtaining the approval of the center station. In each communication process, a terminal station at a transmitting end first sends the transmitted data to the center station through an open wireless channel, and then forwards it to a destination terminal station through the open wireless channel by the relay of the center station to complete end-to-end transmission of information. A schematic diagram of communication of terminal stations in a star network is shown in FIG. 1. A star network is convenient for network management. The network can be monitored and modified by setting a network management station. The information rate between a small station (i.e., a terminal station that is not a center station) and a center station is much higher than that between a small station and another small station, which can greatly reduce the transmission delay. However, due to two-hop operation required for each communication, path transmission delay is increased. Channel resource is occupied twice, which reduces the working efficiency of the system.

In a star network, each terminal station obtains synchronization and indication information from a center station, including carrier wave synchronization, clock synchronization, time synchronization, indication information acquisition, channel state control, network management information, and so on.

However, this pilot synchronization and indication information service is internal or drive information of a satellite network, which is tightly coupled with the star satellite network in terms of technical system and resource use. Even if other satellite networks share the same satellite channel resource, they cannot obtain and apply the pilot and indication information.

In a mesh network, multiple terminal stations can communicate directly without a relay of a station. A communication link can be directly established between any two terminal stations to complete the communication process. The communication of a mesh network among terminal stations is shown in FIG. 2. The structure of a mesh network is convenient for direct communication among terminal stations, which is more flexible. Each communication only occupies satellite channel resource once. In a mesh network structure, it is also necessary to preset or formulate a station as a base station or a management station during each networking communication to act as a satellite center station in a star network, so as to provide a pilot signal and indication signal reference for interconnection of all networking terminal stations. Similarly, this pilot synchronization and indication information is internal or drive information of a satellite network, which is tightly coupled with the mesh satellite network in terms of technical system and resource use. Other satellite networks cannot obtain and apply the pilot and indication information.

In fact, all satellite communication networks or other open wireless channel interconnected networks use internal or drive information to provide services of pilot signal and indication signal reference. In order to realize open interconnection among different types of satellites or other wireless networks, first it is necessary to provide reference service of a pilot signal and indication signal from bypass independent from various network forms and technical systems, so as to realize the unification, standardization and simplification of this synchronization service in the integration of network interconnection and interworking, which is a key and basic technology for further integration and standardization of wireless network service.

Open wireless channel can support any form of network on the basis of resource sharing. However, in the existing technical systems, various types of star networks, tree networks or mesh networks have a variety of technical systems such as TDM/FDM, FDMA, TDMA, CDMA, which are incompatible with each other.

SUMMARY

In order to overcome the defects of the prior art, the technical problem to be solved by the invention is to provide a method for piloting from bypass in a network with open wireless channels, which can realize the unification, standardization and simplification of pilot synchronization service in the integration of network interconnection and interworking, including carrier wave synchronization, clock synchronization, time synchronization, indication information acquisition, channel state control, network management information service. It is a key and basic technology for further integration and standardization of wireless network service.

The technical scheme of the invention is as follows.

This method for piloting from bypass in a network with open wireless channels, comprises:

selecting a terminal station as a reference in open wireless channels, and sending a pilot signal; all or some frequency bands of open wireless channels are occupied by the pilot signal for transmission; all or some frequency bands of open wireless channels occupied by the pilot signal are pilot bands, and the proportion of power of the pilot signal to the total power of the pilot frequency bands is 0.1‰-5%; when the pilot signal is transmitted, it is spread with a spread spectrum code and superimposed on a communication signal in the pilot frequency bands in a low power spectrum signal mode similar with noise; the influence on the received signal-to-noise ratio of the receiving end signal is lower than that on the background thermal noise of the receiving end;

the pilot signal provides pilot, carrier wave and clock synchronization, standard timing and indication information for network construction and mutual communication of multiple types of terminal stations in channels.

In the invention, a pilot signal from bypass in a network is superimposed on data signal carrier wave in open wireless channels. The proportion of power of the pilot signal to the total power of the pilot frequency bands is 0.1‰-5%. The selection of this parameter shall ensure that the power of the pilot signal is far lower than that of other signals, and does not affect the transmission and reception of data signal carrier wave. At the same time, the pilot signal can be reliably received by all terminal stations to provide high-quality synchronization and timing information. Other data signals do not need to insert redundant synchronization pilot and channel state measurement data into service data, so as to reduce the complexity of each communication process and improve the transmission efficiency and reliability. When the pilot signal is transmitted, it is spread with a spread spectrum code and superimposed on a communication signal in the pilot frequency bands in a low power spectrum signal mode similar with noise. The influence on the received signal-to-noise ratio of the receiving end signal is lower than that on the background thermal noise of the receiving end. The pilot signal has anti-interference characteristics of a spread spectrum signal. In the condition that the pilot frequency bands are completely occupied by other signal powers, it can also ensure the reliable reception of each receiving end in channels, and provide pilot, carrier wave and clock synchronization, standard timing and indication information for network construction and mutual communication of multiple types of terminal stations in channels. Therefore, the unification, standardization and simplification of this pilot synchronization service in the integration of network interconnection and interworking can be realized, including carrier wave synchronization, clock synchronization, time synchronization, indication information acquisition, channel state control, network management information service. It is a key and basic technology for further integration and standardization of wireless network service.

DETAILED DESCRIPTION OF THE EMBODIMENTS

Figure 1:
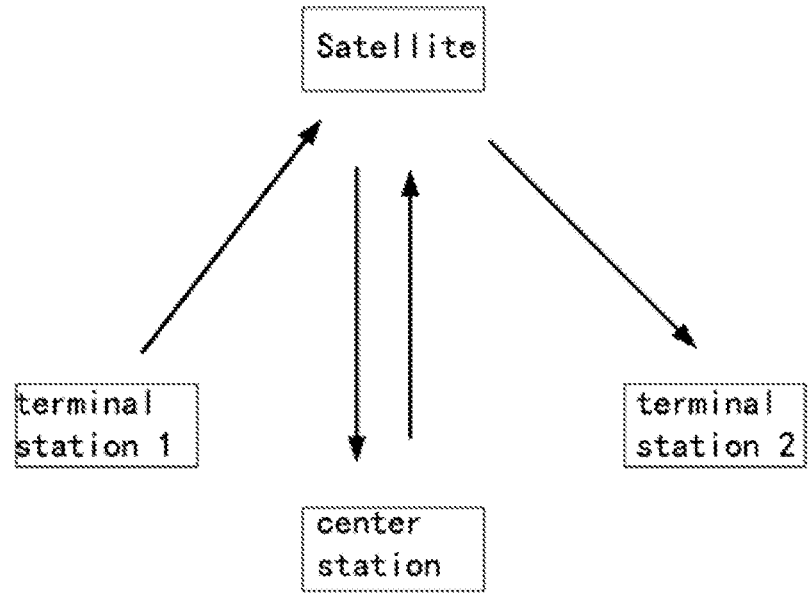
FIG. 1 is a schematic diagram showing communication of terminal stations in a star network.
Figure 2:
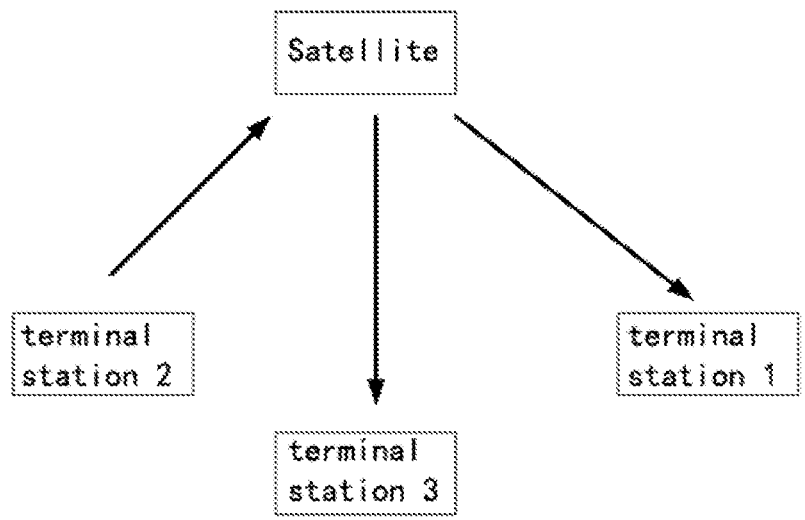
FIG. 2 is schematic diagram showing communication of terminal stations in a mesh network.

This method for piloting from bypass in a network with open wireless channels, comprises:

selecting a terminal station as a reference in open wireless channels, and sending a pilot signal; wherein all or some frequency bands of open wireless channels are occupied by the pilot signal for transmission; all or some frequency bands of open wireless channels occupied by the pilot signal are pilot frequency bands, and the proportion of power of the pilot signal to the total power of the pilot frequency bands is 0.1‰-5%; spreading the pilot signal with a spread spectrum code when it is transmitted, and then superimposing on a communication signal in the pilot frequency bands in a low power spectrum signal mode similar with noise; the influence on the received signal-to-noise ratio of the receiving end signal is lower than that on the background thermal noise of the receiving end;

providing pilot, carrier wave and clock synchronization, standard timing and indication information for network construction and mutual communication of multiple types of terminal stations in channels by the pilot signal.

In the invention a pilot signal from bypass in a network is superimposed on data signal carrier wave in open wireless channels. The proportion of power of the pilot signal to the total power of the pilot frequency bands is 0.1‰-5%. The selection of this parameter shall ensure that the power of the pilot signal is far lower than that of other signals, and does not affect the transmission and reception of data signal carrier wave. At the same time, the pilot signal can be reliably received by all terminal stations to provide high-quality synchronization and timing information. Other data signals do not need to insert redundant synchronization pilot and channel state measurement data into service data, so as to reduce the complexity of each communication process and improve the transmission efficiency and reliability. When the pilot signal is transmitted, it is spread with a spread spectrum code and superimposed on a communication signal in the pilot frequency bands in a low power spectrum signal mode similar with noise. The influence on the received signal-to-noise ratio of the receiving end signal is lower than that on the background thermal noise of the receiving end. The pilot signal has anti-interference characteristics of a spread spectrum signal. In the condition that the pilot frequency bands are completely occupied by other signal powers, it can also ensure the reliable reception of each receiving end in channels, and provide pilot, carrier wave and clock synchronization, standard timing and indication information for network construction and mutual communication of multiple types of terminal stations in channels. Therefore, the unification, standardization and simplification of this pilot synchronization service in the integration of network interconnection and interworking can be realized, including carrier wave synchronization, clock synchronization, time synchronization, indication information acquisition, channel state control, network management information service. It is a key and basic technology for further integration and standardization of wireless network service.

Figure 3:
FIG. 3 is a schematic diagram showing a structure of a pilot frequency frame according to a preferred embodiment of the present invention.

Preferably, as shown in FIG. 3, the pilot signal comprises: a frame header, a frame number (ID) and an indication information data body (Data Frame). The frame header includes a synchronization header and a pilot. The synchronization header is used for timing of a pilot signal frame and recovery of a carrier wave, and the pilot is used to eliminate frequency offset of the pilot signal frame. The frame number is identification of cyclic sequence of the pilot signal frame. The indication information data body is used to carry indication information for indicating channel, network state and management information.

Figure 4:
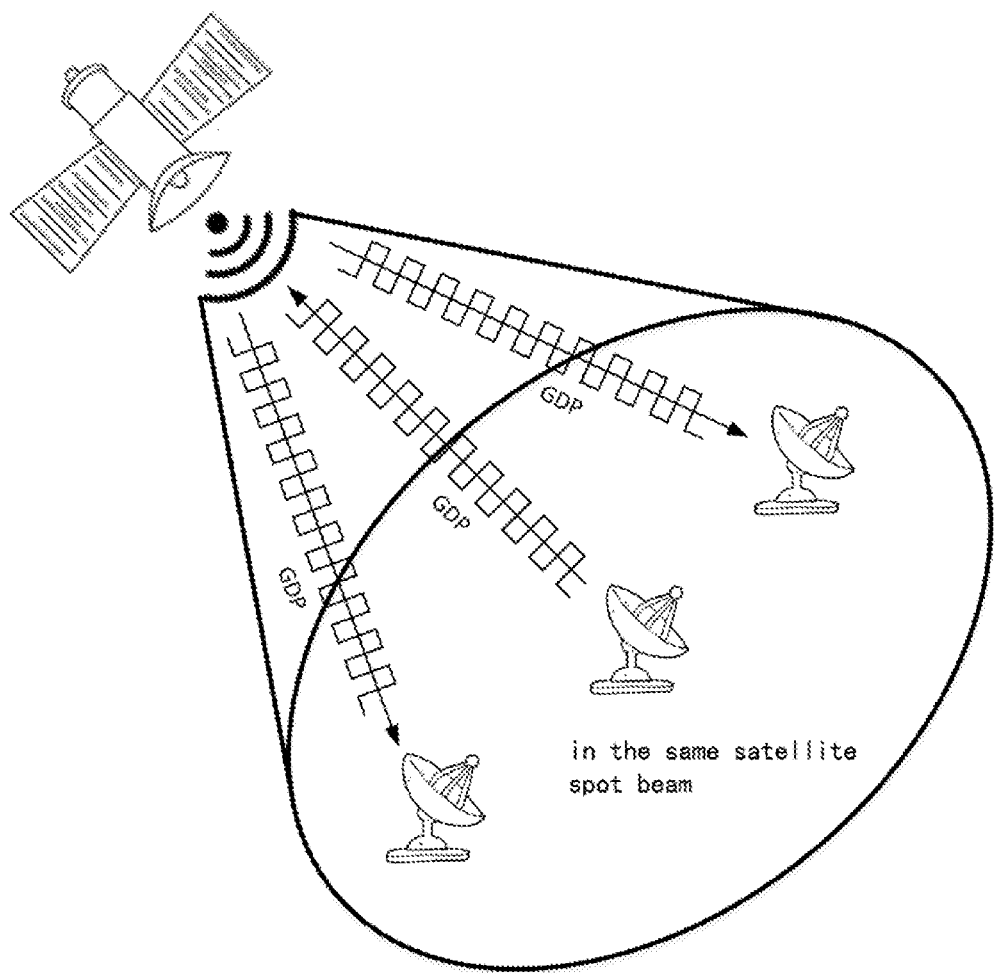
FIG. 4 is a schematic diagram showing transmission of a pilot signal of a terminal station according to the present invention, wherein the pilot signal does not include an indication information data body.
Figure 5:
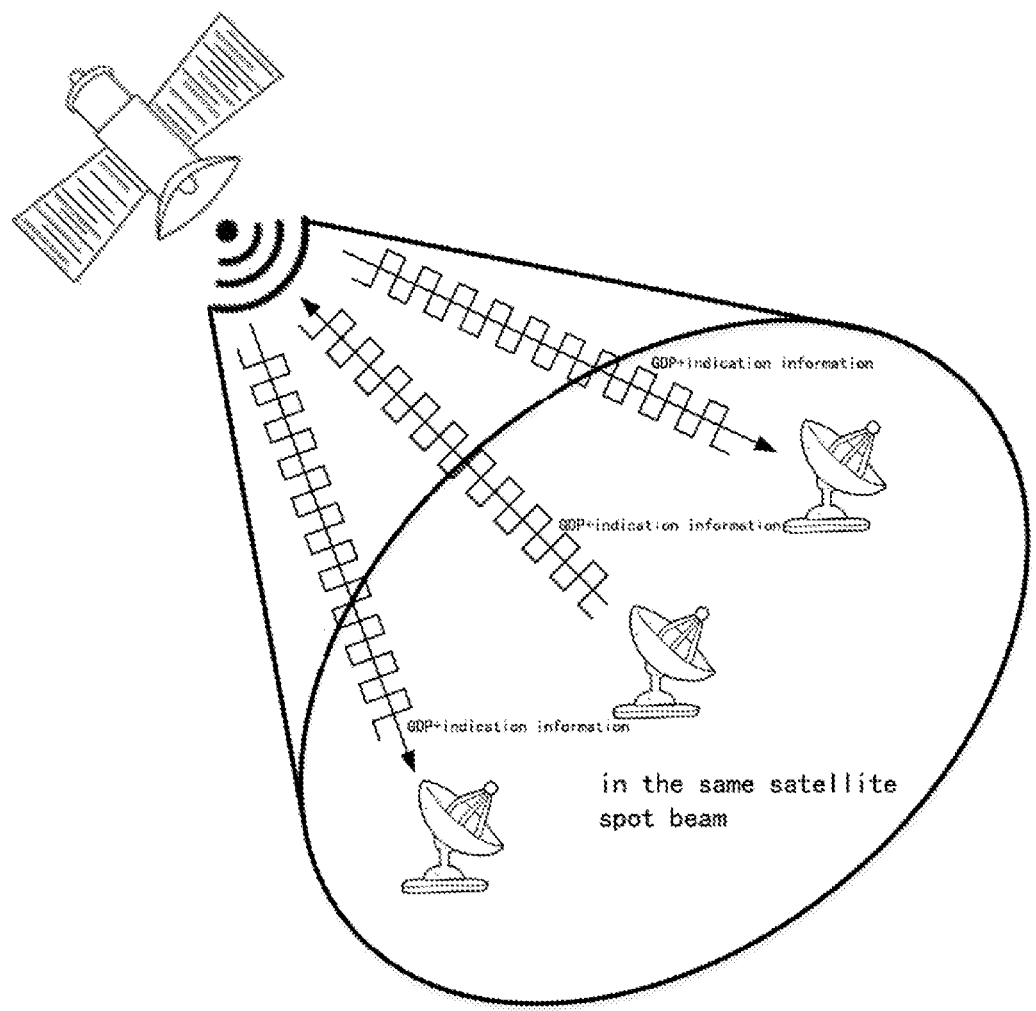
FIG. 5 is a schematic diagram showing transmission of a pilot signal of a terminal station according to the present invention, wherein the pilot signal includes an indication information data body.

Each terminal station demodulates and receives the pilot signal, extracts the carrier and clock information, identifies a reference station transmitting pilot information according to the indication information in the pilot signal, and completes reception of other indication information. FIG. 4 shows transmission of a pilot signal of a terminal station according to the present invention, wherein the pilot signal does not include an indication information data body. FIG. 5 shows transmission of a pilot signal of a terminal station according to the present invention, wherein the pilot signal includes an indication information data body.

Further, the pilot signal is circularly modulated in the mode of Binary-Phase-Shift-Keying (BPSK), and continuously or regularly transmitted. In this way, all terminal stations in the network can receive the pilot signal.

Further, the length of the synchronization header is in the range of 16-1024 bits. The pilot field is all 0 field, and its length is more than 30 bits. The length of the frame number is identified in the cyclic sequence of the pilot signal. The length of the indication information data body is in the range of 0-65516 bits.

For example, in a pilot signal format, a synchronization header is a 64 bit differential M-sequence (M-sequence is the most basic PN sequence used in CDMA system and the abbreviation of the longest linear feedback shift register sequence), a pilot is a full "0" sequence with a length of 520 bits, a frame number is an 8 bit sequence number, which is used to represent 0-255, and a data body uses a length of 1008 bits, LDPC coding of 1/4 bit rate for channel coding.

In another pilot signal format, a synchronization header is a 16 bit differential M-sequence, a pilot is a full "0" sequence with a length of 100 bits, a frame number is a 12 bit sequence number, which is used to represent 0-4095, and a data body uses a length of 512 bits, Turbo coding for channel coding.

Further, the accuracy of clock synchronization in a pilot signal takes the pilot signal as a basic identification unit of a clock reference. By adopting a fixed length of a signal frame, a stable transmission cycle in the pilot signal and identifying a frame number in the signal frame, it is used as a long-term clock reference in open wireless channels. Terminal stations receive the pilot signal continuously or intermittently, and can distinguish each frame in the received pilot signal according to the frame number. As the pilot signal, the length of each frame is fixed, the information rate of each frame is fixed, so the time represented by each frame is also fixed. Therefore, terminal stations can determine a time interval through an interval between frames of the pilot signal. Take the interval between frames of the pilot signal (i.e., a signal frame period) as a basic unit of clock, and complete the time calibration by a time difference between frames with different serial numbers. If the time interval count of a front and rear frame is not equal to the pilot signal frame period, a terminal clock needs to be adjusted.

Further, a length of a signal frame can be selected as some nominal integer values, such as 50 ms, 100 ms and 200 ms, as a basic cycle unit of a system clock, which is convenient for use and connection with the application.

Preferably, spread spectrum communication is performed by using a spread spectrum code with a length of 64-65536 bits. In the range of spread spectrum code length within 64-65536 bits, 64-4096 bits spread spectrum codes are selected for spread spectrum communication. The best use range of spread spectrum codes is 1024-4096. In this range, the effect of spectrum expansion in spread spectrum communication is optimum. The spread spectrum code here is for the data body.

Further, the spread spectrum code adopts M-sequence, Gold code (Gold code is a pseudo-random code derived from M-sequence, which has pseudo-random properties similar to M-sequence, but the number of sequences whose lengths are different is more than that of M-sequence), OVSF code (Orthogonal Variable Spreading Factor. OVSF code is mainly used for orthogonal spread spectrum. The rate of service channels is different, and the length of OVSF code used is different.) or C/A code (Coarse Acquisition Code. A pseudo-random code sent by GPS satellite for coarse ranging and acquisition of GPS satellite, in fact, it is a Gold code, that is, a Gold code composed of two 10 level feedback shift registers).

Preferably, the synchronization header of the pilot signal adopts a differential M-sequence. First, generating an M-sequence, and then differential coding the M-sequence to eliminate the influence of frequency offset. A sequence after differential coding is used as the synchronization header. The spread spectrum method here is for the synchronization header of the pilot signal.

Further, the spread spectrum code sequence adopts an M-sequence with a length of 12-1024 bits as a basic time sequence. Preferably, the spread spectrum code uses an M-sequence with a length of 12428 bits as a basic time sequence. The 64 bits differential M-sequence is used as a synchronization header of a pilot signal, and the performance of fast synchronization acquisition is optimum.

Further, indication information is added to the indication information data body of a pilot signal frame. The indication information comprises: the pilot frame number, channel resource alposition information, terminal station network access information, terminal station working state information, open wireless channel state monitoring information, network management information, service information and security prompt information. Adding indication information to the data body can make the pilot signal have the ability of network management in addition to realizing accurate clock synchronization. A network management center station can broadcast the pilot signal to the whole network by adding indication information to the data body. After receiving it, user stations in the whole network can obtain the indication information from the network management center station. Thus, the ability of network information synchronization, network resource management and scheduling, and network state perception can be achieved.

Further, the indication information data body is encoded by channel coding, which adopts LDPC (Low-density Parity-check) code, Polar code, RS code (Reed-Solomon codes), convolutional code or Turbo code (also known as parallel concatenated convolutional code). The data body is encoded by channel coding and then transmitted, which can significantly improve the received signal-to-noise ratio of the data body at the receiving end of the pilot signal, improve the receiving performance, enable the data body to receive normally in non-optimal working state, and improve the robustness of the whole system.

Further, in the set open wireless channel, after starting up, a terminal station first monitors the pilot signal and synchronously accesses the network under its guidance. If the pilot signal is not received within a certain time limit, the terminal station can regard itself as the first initiator of group network communication in the set open wireless channel and start transmitting the pilot signal to become the reference station in the current open wireless channel. In this way, when there is the reference station in the network, the user station accepts the pilot signal sent by the reference station to join the network. If the pilot signal is interrupted for a certain time limit, other terminal stations in the channel can be selected according to the preset rules or start sending pilot signals from one terminal station to become a new reference station, so as to avoid the collapse of the whole network after the fault of the reference station.

Preferably, in open wireless channels with a relay forwarding node, measuring the current distance between a reference station and a shared relay forwarding node with self-transmitting and self-receiving of a pilot signal by the reference station; by continuously measuring the distance, the change of the distance between a reference station and a receiving end station can be measured when they move.

In the process that a reference station continuously sends a pilot signal, a synchronous satellite will move periodically around its positioning point in a synchronous orbit, showing an "8" track relative to a point under the satellite. Therefore, the distance between the satellite and the reference station will change continuously, resulting in continuous change of a path delay of a pilot signal. Observed at the reference station, the movement of the satellite shows a certain regularity, which changes from far to near and then from near to far. Therefore, the change of the path delay also shows a certain regularity.

At the reference station, by self-transmitting and self-receiving of a pilot signal, the change of a link path delay transmitted to the satellite is consistent with that of a link path delay received from the satellite signal. Therefore, the phase delay between a receiving end and transmitting end of the pilot signal is equivalent to double the change of a satellite to ground path delay. Therefore, when a receiver of spread spectrum communication detects that the maximum correlation peak is moving in a certain direction, a phase delay can be obtained while tracking the maximum correlation peak. Half of the phase delay is the path delay. The change of absolute distances between the satellite and the reference station can be obtained by multiplying the path delay by the speed of light.

Preferably, in open wireless channels sharing a relay forwarding node, three different reference stations with fixed geographical position and different threshold, three independent pilot signals are transmitted respectively, and the pilot signals are self-transmitting and self-receiving, so as to measure the current distances between the three reference stations and the shared relay forwarding node at the same time. Then the spatial position of the current shared relay forwarding node is calculated, and the spatial position of the shared relay forwarding node is continuously measured, so as to measure the change of the position of the shared relay forwarding node when the shared relay forwarding node moves.

Preferably, a time difference that a pilot signal travels from the reference station to the receiving terminal station is calculated by receiving the pilot signal, so as to obtain the current absolute distance between the reference station and the receiving terminal station. By continuously measuring the distance, the change of the distance between the reference station and the receiving terminal station can be measured when the reference station and the receiving terminal station move.

Preferably, in open wireless channels sharing a relay forwarding node, the distance between the reference station and the terminal station and the position of the shared relay forwarding node can be measured based on the pilot signal. When the position of the reference station is known, the distance from the terminal station to the shared relay forwarding node can be measured. If the shared relay forwarding node is movable, when the shared relay forwarding node is in three different positions, the geographical position of the terminal station can be located by measuring the distance from the terminal station to the shared relay forwarding node. If the shared relay forwarding node moves periodically and can be measured, the position of the terminal station can be continuously measured with the pilot signal and the periodic motion orbit information of the shared relay forwarding node.

Preferably, the terminal station calibrates and calculates time by continuously receiving the pilot signal and recording the position and number of fixed length frames in the pilot signal, so as to achieve the accurate real-time synchronization of the clock between each terminal station and the reference station, thus to realize the accurate real-time synchronization of the clock of the whole network.

Preferably, for a system with low real-time accuracy, the pilot signal is transmitted in an interval, and absolute time information is added to the pilot signal. The receiving terminal station receives the pilot signal in the interval, so as to achieve timing synchronization between each terminal station and the reference station, thus to realize the quasi synchronization of the clock of the whole network.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A method for piloting from bypass in a network with open wireless channels, comprising:
   1) Selecting a terminal station as a reference in the open wireless channels, and sending a pilot signal, wherein all or some frequency bands of the open wireless channels are occupied by the pilot signal for transmission; the all or some frequency bands of the open wireless channels occupied by the pilot signal are pilot frequency bands, and a proportion of power of the pilot signal to a total power of the pilot frequency bands is 0.1‰-5%;
   2) Spreading the pilot signal with a spread spectrum code when the pilot signal is transmitted, and then superimposing the pilot signal on a communication signal in the pilot frequency bands in a low power spectrum signal mode similar with noise; an influence on a received signal-to-noise ratio of a receiving end signal is lower than an influence on background thermal noise of a receiving end;
   3) Providing a pilot, a carrier wave synchronization, a clock synchronization, standard timing, and indication information for network construction and mutual communication of multiple types of terminal stations in the open wireless channels by the pilot signal.

2. The method according to claim 1, wherein the pilot signal comprises: a frame header, a frame number and an indication information data body, wherein the frame header comprises a synchronization header and a pilot; the synchronization header is used for timing of a pilot signal frame and recovery of a carrier wave, and the pilot is used to eliminate a frequency offset of the pilot signal frame; the frame number is identification of a cyclic sequence of the pilot signal frame; the indication information data body is used to carry the indication information for indicating the channels, a network state and management information;

each of the terminal stations demodulates and receives the pilot signal, extracts the carrier wave and clock information, identifies a reference station transmitting pilot information according to the indication information in the pilot signal, and completes reception of other indication information.

3. The method according to claim 2, wherein the pilot signal is circularly modulated in a mode of Binary-Phase-Shift-Keying.

4. The method according to claim 3, wherein a length of a synchronization header is in a range of 16-1024 bits; a pilot field is all 0 field, and a length of the pilot field is more than 30 bits; a length of the frame number is identified in the cyclic sequence of the pilot signal frame; a length of the indication information data body is in a range of 0-65516 bits.

5. The method according to claim 4, wherein an accuracy of the clock synchronization in the pilot signal takes the pilot signal as a basic identification unit of a clock reference; by adopting a fixed length of a signal frame, a stable transmission cycle in the pilot signal and identifying the frame number in the signal frame, the signal frame is used as a long-term clock reference in the open wireless channels.

6. The method according to claim 1, wherein spread spectrum communication is performed by using a spread spectrum code with a length of 64-65536 bits.

7. The method according to claim 6, wherein the spread spectrum code adopts a maximum length sequence (M-sequence), a Gold code, an Orthogonal Variable Spreading Factor (OVSF) code or a Coarse Acquisition (C/A) code.

8. The method according to claim 2, wherein
the synchronization header of the pilot signal adopts a differential M-sequence;
a method of adopting the differential M-sequence comprises: generating an M-sequence, and then differential coding the M-sequence to eliminate an influence of the frequency offset, and using a sequence obtained after the differential coding as the synchronization header.

9. The method according to claim 8, wherein the spread spectrum code adopts an M-sequence with a length of 12-1024 bits as a basic time sequence.

10. The method according to claim 9, further comprising adding the indication information to the indication information data body of the pilot signal frame, wherein the indication information comprises: the pilot frame number, channel resource alposition information, terminal station network access information, terminal station working state information, open wireless channel state monitoring information, network management information, service information, and security prompt information.

11. The method according to claim 10, further comprising encoding the indication information data body by channel coding, wherein the channel coding adopts Low-density Parity-check (LDPC) coding, Polar coding, Reed-Solomon (RS) coding, convolutional coding, or Turbo coding.

12. The method according to claim 11, wherein in a set open wireless channel of the open wireless channels, after starting up, a terminal station in the terminal stations first monitors the pilot signal and synchronously accesses the network under a guidance of the pilot signal; if the pilot signal is not received within a certain time limit, the terminal station regards the terminal station as a first initiator of group network communication in the set open wireless channel and starts transmitting the pilot signal to become a reference station in a current open wireless channel.

13. The method according to claim 12, wherein in the open wireless channels with a relay forwarding node, the method further comprises measuring a current distance between the reference station and the relay forwarding node with self-transmitting and self-receiving of a pilot signal by the reference station, and by continuously measuring the current distance, measuring a change of the current distance between the reference station and a receiving terminal station when the reference station and the receiving terminal station move.

14. The method according to claim 12, wherein in the open wireless channels sharing a relay forwarding node, the method further comprises setting three different reference stations with a fixed geographical position and different thresholds, transmitting three independent pilot signals respectively, and self-transmitting and self-receiving the pilot signals, so as to measure current distances between each of the three reference stations and the relay forwarding node at the same time; then calculating a spatial position of the relay forwarding node, and measuring the spatial position of the relay forwarding node continuously, so as to measure a change of the spatial position of the relay forwarding node when the relay forwarding node moves.

15. The method according to claim 14, further comprising: calculating a time difference when a pilot signal travels from a reference station of the three reference stations to a receiving terminal station by receiving the pilot signal, so as to obtain a current absolute distance between the reference station and the receiving terminal station; by continuously measuring the current absolute distance, measuring a change of a distance between the reference station and the receiving terminal station when the reference station and the receiving terminal station move.

16. The method according to claim 15, wherein in the open wireless channels sharing the relay forwarding node, the method further comprises:
measuring the distance between the reference station and the receiving terminal station and a position of the relay forwarding node based on the pilot signal;
when a position of the reference station is known, measuring a distance from the receiving terminal station to the relay forwarding node;
if the relay forwarding node is movable, when the relay forwarding node is in three different positions, locating a geographical position of the receiving terminal station by measuring the distance from the receiving terminal station to the relay forwarding node;
if the relay forwarding node moves periodically, measuring the geographical position of the corresponding receiving terminal station continuously using the corresponding pilot signal and periodic motion orbit information of the relay forwarding node.

17. The method according to claim 5, wherein each of the terminal stations calibrates and calculates time by continuously receiving the pilot signal and recording a position and a number of fixed length frames in the pilot signal, so as to achieve an accurate real-time synchronization for the clock synchronization between each of the terminal stations and the reference station, and to realize the accurate real-time synchronization of a clock of the network.

18. The method according to claim 5, further comprising:
transmitting the pilot signal in an interval, and adding absolute time information to the pilot signal;
receiving the pilot signal in the interval by the terminal stations, so as to achieve a timing synchronization between each of the terminal stations and the reference station, and to realize a quasi synchronization of a clock of the network.

19. The method according to claim 2, wherein spread spectrum communication is performed by using a spread spectrum code with a length of 64-65536 bits.

20. The method according to claim 3, wherein spread spectrum communication is performed by using a spread spectrum code with a length of 64-65536 bits.

* * * * *